Dec. 8, 1925.

W. M. BROWN 1,564,197

TESTING APPARATUS

Filed Feb. 27, 1925  3 Sheets-Sheet 3

Witnesses:
Edwin Trueb

Inventor:
WILLIAM MILTON BROWN,
by D. Anthony Usina
his Attorney.

Patented Dec. 8, 1925.

1,564,197

UNITED STATES PATENT OFFICE.

WILLIAM MILTON BROWN, OF JOHNSTOWN, PENNSYLVANIA.

TESTING APPARATUS.

Application filed February 27, 1925. Serial No. 12,053.

*To all whom it may concern:*

Be it known that I, WILLIAM MILTON BROWN, a citizen of the United States, and resident of Johnstown, in the county of Cambria and State of Pennsylvania, have invented certain new and useful Improvements in Testing Apparatus, of which the following is a specification.

This invention relates to testing apparatus, and while not limited thereto relates primarily to testing apparatus for testing the tensile strength of forged or cast guard rail clamps and the like.

The principal object of this invention is to provide a testing apparatus that will be rapid in operation, so as to permit the testing of large quantities of work.

Another object is to provide a testing apparatus that is so simple in construction and operation that unskilled labor may be employed to operate it.

Another object is to provide a testing apparatus of the class described, with an automatic releasing mechanism, which may be adjusted to various positions, and adapted to prevent the stretching of the work pieces beyond their elastic limit.

A further object is to provide a testing apparatus of the class described, composed of the novel construction, design, and combination of parts hereinafter described and illustrated in the accompanying drawings.

In the drawings—

Figure 1:
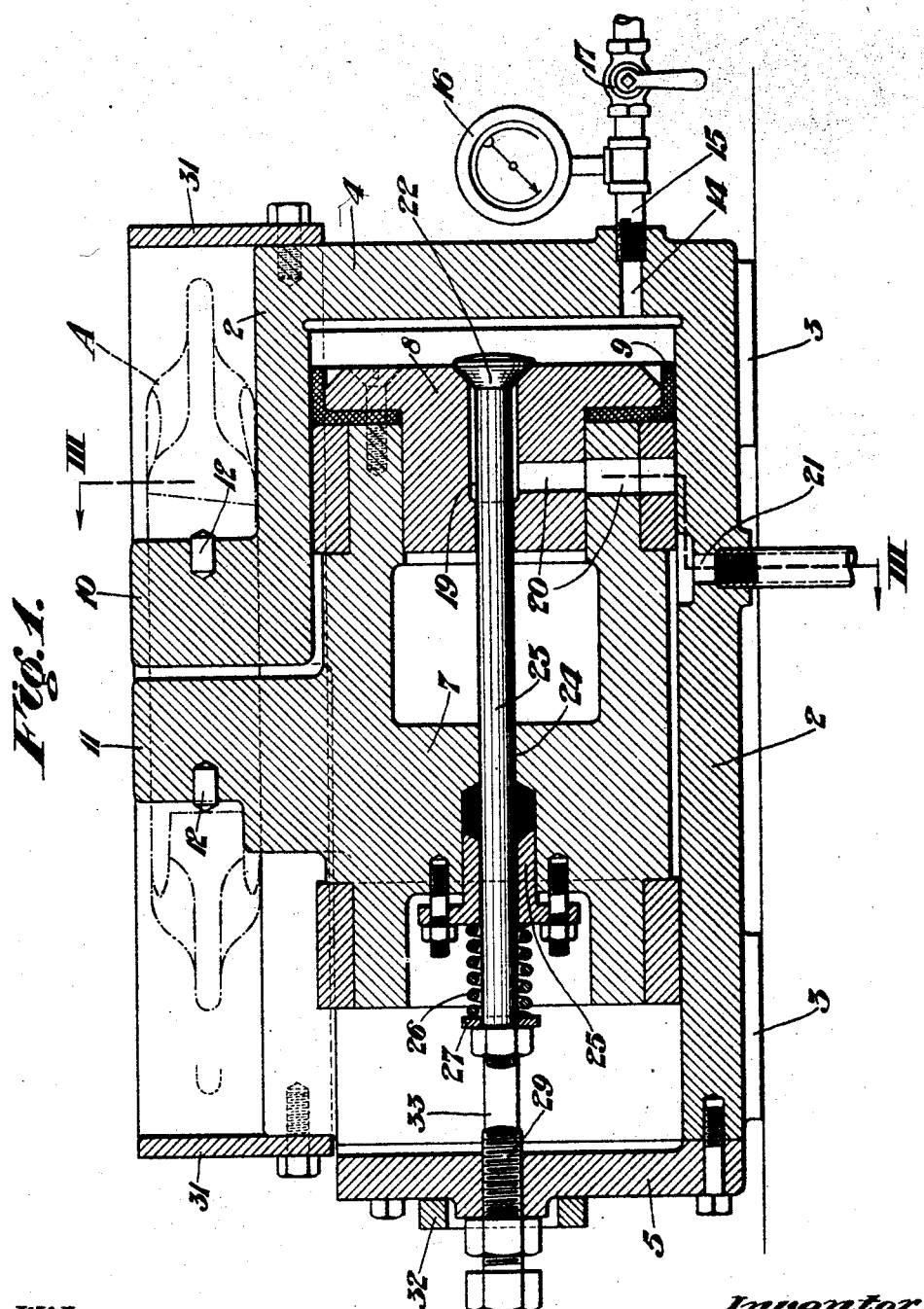
Figure 1 is a sectional side elevation of a testing machine embodying my invention.
Figure 2:
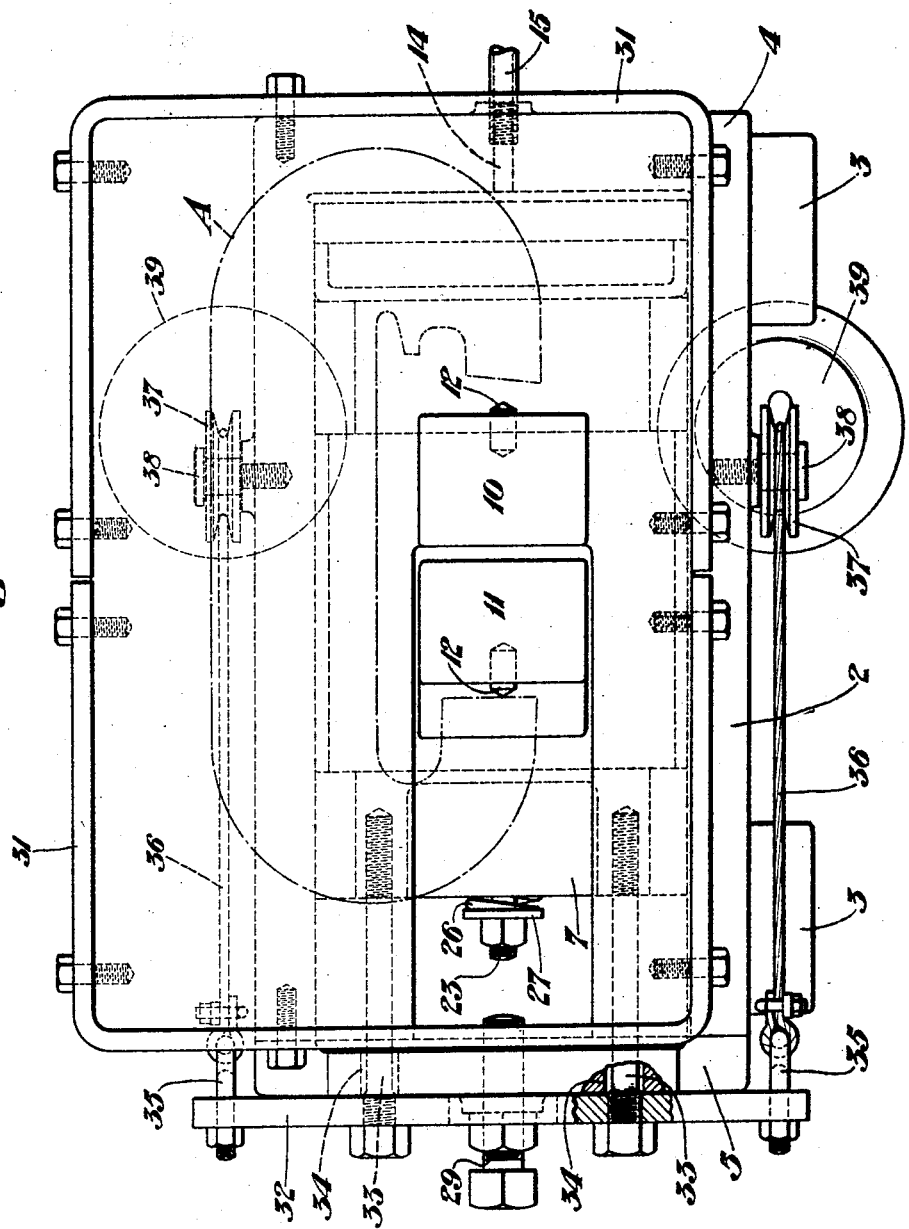
Figure 2 is a top plan thereof.
Figure 3:
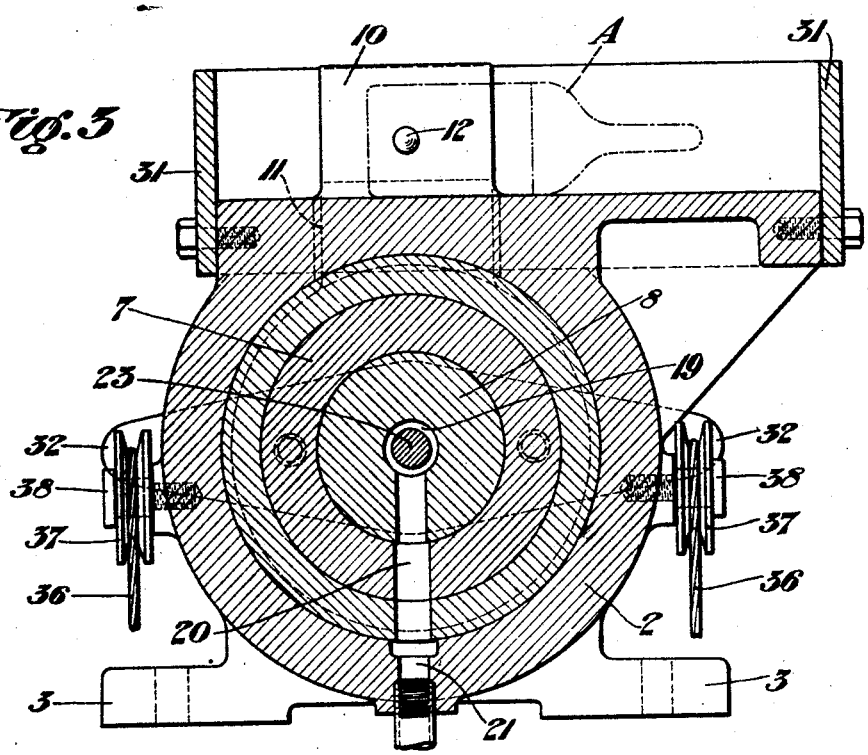
Figure 3 is a sectional elevation taken on the line III—III of Figure 1.
Figure 4:
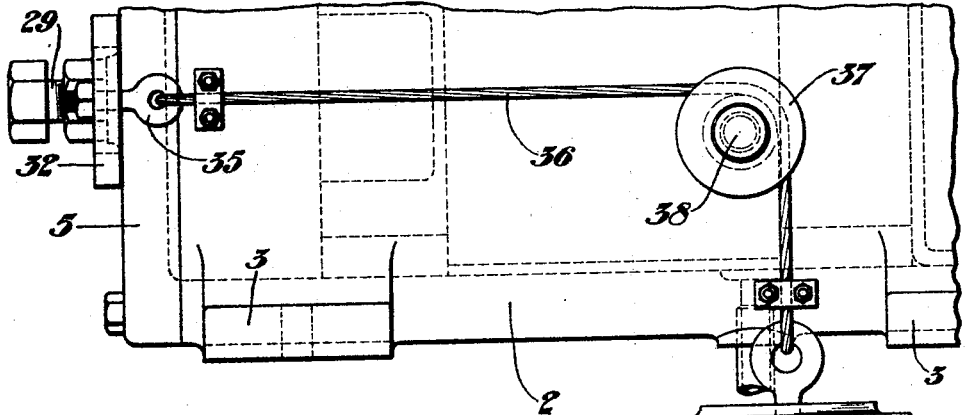
Figure 4 is is a fragmentary side elevation showing the return counterweight mechanism.

Referring more particularly to the drawings, the numeral 2 designates the cylinder which is provided with base flanges 3 adapted to be bolted or otherwise secured to a fixed supporting structure (not shown). The cylinder 2 has its one end 4 formed integral therewith, and its other end 5 is removably bolted in place.

A piston member comprising a body portion 7 and head portion 8 is slidably mounted in the cylinder 2. A suitable packing gland or ring 9 is mounted on the piston head 8 to form a sealed contact with the cylinder wall.

The cylinder member 2 is provided with an integral upwardly projecting jaw member 10, and the piston body 7 is also provided with an integrally formed upwardly projecting jaw member 11, which projects upwardly through a suitable slot or opening in the cylinder 2. The jaws 10 and 11 are each adapted to engage the work piece to be tested and are each provided with removable pointed pin members 12 which serve to prevent slipping of the work piece and also to mark the tested pieces.

This machine is primarily adapted for testing U-shaped rail clamps, such as the clamp A shown in the drawings. Therefore, it will be readily appreciated how, when fluid under pressure is admitted to the cylinder 2 to move the piston forwardly in the cylinder, that the jaw 11 will be moved relative to the jaw 10 and exert a pulling force on the clamp A engaged by said jaws.

The cylinder 2 is provided with a combined inlet and outlet port 14 in the end wall 4, and a fluid supply pipe 15 for fluid under pressure is connected to the port 14. A suitable gage 16 is connected in the pipe 15 to indicate the amount of force exerted on the tested articles. This gage 16 is of standard design and, therefore, will not be described in detail, its feature, however, is that it is so constituted that instead of showing the true pressure of the fluid in the pipe 15, it will register a multiple of the pressure in the tube equivalent to the pressure developed by the piston 7.

A control valve 17, of the usual two-way type and having one port open to the atmosphere, is connected in the pipe 15 to control the inlet and outlet of the fluid to the cylinder 2.

The piston head 8 is provided with a centrally arranged opening 19 which communicates with a transverse opening 20 extending through the piston. A second outlet port 21 is formed in the cylinder 2 and is positioned so that when the piston moves a predetermined distance the opening 20 will register therewith.

A suitable valve 22 is mounted in the opening 19 and is adapted to normally remain in closed position. The stem 23 of the valve 22 extends through an opening 24 in the piston body 7. A stuffing box and gland 25 serve to form a tight fit with said valve stem. The valve stem 23 has its forward end projecting beyond the forward end of the piston body 7 and a coil spring 26 is mounted on the valve stem 23 and tensioned between an adjustable stop ring 27 and the stuffing box 25, so as to cause a constant seating tension on the valve 22.

An adjustable limit or stop member 29 is mounted in the forward end 5 of the cylinder in line with the valve stem 23, so that if the piston is permitted to move beyond a certain predetermined amount, the valve stem 23 will engage the stop 29 and cause the valve 22 to open and permit the escape of the fluid through the openings 19 and 20 and port 21, thus immediately relieving the pressure against the piston head 8. The amount of movement or travel of the piston is determined by the elastic limit of the articles being tested, and the stop member 29 is set so as to operate the valve 22 before the piston reaches a position where it will have stretched the article being tested beyond its elastic limit.

A suitable guard rim or band 31 is provided around the upper end of the cylinder to prevent the flying of broken parts of the articles being tested.

A cross head 32 is mounted on pins or rods 33 mounted in the end of the piston body 7 and projecting through openings 34 in the end wall 5 of the cylinder 2. The cross head 32 is provided with eye members 35 adjacent each end and cable members 36 have one end secured to each of said eyes 35, and are trained rearwardly over sheaves 37 journaled on stub shafts 38 mounted in the side walls of the cylinder 2. The other ends of the cables 36 are secured to a counterweight 39. When fluid is admitted to the cylinder 2 to force the piston forward in the cylinder, the cross head 32 will be moved forwardly and, therefore, raise the counterweight 39, and when such fluid is released from the cylinder 2 the counterweight 39 will return the piston to normal or starting position.

In operation, the clamp A or other article to be tested is mounted with its ends in position to be engaged by the jaws 10 and 11. Fluid under pressure is then admitted to the cylinder 2, through the pipe 15 by operation of the valve 17. The fluid will move the piston forwardly in the cylinder until the jaws 10 and 11 engage the work piece. The amount of fluid pressure will then be increased until the gage 16 indicates that sufficient force has been applied to the article, and then the valve 17 will be operated to release the fluid from the cylinder.

If the valve 17 should not be operated at the proper time and the fluid pressure should continue to build up so as to stretch the work piece A, the valve stem 23 will engage the stop 29 and open the valve 22 to permit the escape of the fluid pressure through the openings 19 and 20 and port 21, thereby preventing the piece being stretched beyond its elastic limit.

Also if a work piece should break, the sudden release of tension would cause the piston to be suddenly thrust along the entire length of the cylinder with such force as to possibly destroy the machine, if it were not for the automatic release valve 22 which serves to automatically release the pressure, when the piston travels a certain distance.

While I have shown one specific embodiment of my invention, I do not wish to be limited thereto, since various modifications may be made without departing from the scope of my invention as defined in the appended claims.

I claim:

1. A testing machine for testing the tensile strength of forgings, castings, and the like, comprising a cylinder member, a piston member mounted in said cylinder, jaw members on said cylinder and piston members adapted to engage the work piece to be tested, a combined inlet and outlet port for fluid under pressure for operating said piston, a fluid pressure supply pipe connecting with said inlet, a gage connected with said pipe and adapted to indicate a multiple of the pressure of the fluid in said pipe equivalent to the pressure developed by said piston, and a valve connected in said supply pipe for controlling the flow of fluid pressure to said cylinder.

2. A testing machine for testing the tensile strength of forgings, castings, and the like, comprising a cylinder member, a piston member mounted in said cylinder, jaw members formed integral with said cylinder and piston members adapted to engage the work piece to be tested, a combined inlet and outlet port for fluid under pressure for operating said piston, a fluid pressure supply pipe connecting with said inlet, a gage connected with said pipe and adapted to indicate a multiple of the pressure of the fluid in said pipe equivalent to the pressure developed by said piston, and a valve connected in said supply pipe for controlling the flow of fluid pressure to said cylinder.

3. A testing machine for testing the tensile strength of forgings, castings, and the like, comprising a cylinder member, a piston member mounted in said cylinder, jaw members on said cylinder and piston members adapted to engage the work piece to be tested, a combined inlet and outlet port for fluid under pressure for operating said piston, a fluid pressure supply pipe connecting with said inlet, a valve connected in said supply pipe for controlling the flow of fluid pressure to said cylinder, a cross head mounted on said piston, and counterweight mechanism connected with said cross head for returning said piston to normal position.

4. A testing machine for testing the tensile strength of forgings, castings, and the like, comprising a cylinder member, a piston member mounted in said cylinder, jaw members on said cylinder and piston members adapted to engage the work piece to be tested, a combined inlet and outlet port for fluid under pressure for operating said piston, a fluid pressure supply pipe connecting with said inlet, a valve connected in said supply pipe for controlling the flow of fluid pressure to said cylinder, and means for automatically releasing the fluid pressure from against said piston after said piston has moved a predetermined amount.

5. A testing machine for testing the tensile strength of forgings, castings, and the like, comprising a cylinder member, a piston member mounted in said cylinder, jaw members on said cylinder and piston members adapted to engage the work piece to be tested, a combined inlet and outlet port for fluid under pressure for operating said piston, a fluid pressure supply pipe connecting with said inlet, a valve connected in said supply pipe for controlling the flow of fluid pressure to said cylinder, means for returning said piston to normal or starting position after said fluid pressure has been cut off from said cylinder, and means for automatically releasing the fluid pressure from against said piston after said piston has moved a predetermined amount.

6. A testing machine for testing the tensile strength of forgings, castings, and the like, comprising, in combination, a fixed cylinder, a piston mounted in said cylinder, jaw members formed integral with said cylinder and piston and adapted to engage the work piece to be tested, a combined inlet and outlet port for fluid under pressure for operating said piston, a fluid supply pipe connecting with said port, a gage connected with said pipe and adapted to indicate a multiple of the fluid pressure in said pipe equivalent to the pressure developed by said piston, a valve for controlling the flow of fluid to said cylinder, a second valve adapted to automatically permit the escape of the fluid pressure from said cylinder after said piston has moved a predetermined amount, and means for returning said piston to normal or starting position after said fluid pressure is released from said cylinder.

7. A testing machine for testing the tensile strength of forgings, castings, and the like, comprising, in combination, a fixed cylinder, a piston mounted in said cylinder, jaw members formed integral with said cylinder and piston and adapted to engage the work piece to be tested, a combined inlet and outlet port for fluid under pressure for operating said piston, a fluid supply pipe connecting with said port, a gage connected with said pipe and adapted to indicate a multiple of the fluid pressure in said pipe equivalent to the pressure developed by said piston, a valve for controlling the flow of fluid to said cylinder, a second valve adapted to automatically permit the escape of the fluid pressure from said cylinder after said piston has moved a predetermined amount, and a counterweight mechanism for returning said piston to normal or starting position after said fluid pressure is released from said cylinder.

8. A testing machine for testing the tensile strength of forgings, castings and the like, comprising, in combination, a fixed cylinder, a piston mounted in said cylinder, jaw members formed integral with said cylinder and piston and adapted to engage the work piece to be tested, means carried by said jaws for marking the work piece tested, a combined inlet and outlet port for fluid under pressure for operating said piston, a fluid supply pipe connecting with said port, and a valve connected in said supply pipe for controlling the flow of fluid to said cylinder.

In testimony whereof, I have hereunto set my hand.

WILLIAM MILTON BROWN.